United States Patent [19]

Kasai

[11] Patent Number: 5,313,600
[45] Date of Patent: May 17, 1994

[54] SYSTEM FOR CONTROLLING THE NUMBER OF DATA PIECES IN A QUEUE MEMORY

[75] Inventor: Yoshio Kasai, Itami, Japan

[73] Assignee: Mitsubishi Denki Kabushiki Kaisha, Tokyo, Japan

[21] Appl. No.: 928,144

[22] Filed: Aug. 11, 1992

Related U.S. Application Data

[63] Continuation of Ser. No. 388,794, Aug. 2, 1989, abandoned.

[30] Foreign Application Priority Data

Dec. 2, 1988 [JP] Japan .................. 63-306545

[51] Int. Cl.5 .................. G06F 9/22
[52] U.S. Cl. .................. 395/375; 364/244.3; 364/247.7; 364/251.3; 364/254.5; 364/946.2; 364/957.6; 364/960.2; 364/DIG. 2
[58] Field of Search .................. 395/375

[56] References Cited

U.S. PATENT DOCUMENTS

| 4,398,245 | 8/1983 | Fujita . | |
|---|---|---|---|
| 4,677,544 | 6/1987 | Kinoshita . | |
| 4,677,545 | 6/1987 | Blahut . | |
| 4,709,324 | 11/1987 | Kloker | 395/725 |
| 4,719,570 | 1/1988 | Kawabe . | |
| 4,791,557 | 12/1988 | Angel et al. | 395/375 |
| 4,819,155 | 4/1989 | Wulf et al. . | |
| 4,827,402 | 5/1989 | Wada . | |
| 4,847,748 | 7/1989 | Yamahata et al. . | |
| 4,847,753 | 7/1989 | Matsuo et al. . | |
| 5,046,040 | 9/1991 | Miyoshi | 395/375 |

FOREIGN PATENT DOCUMENTS 0180005 5/1986 European Pat. Off. .

OTHER PUBLICATIONS

*IBM Technical Disclosure Bulletin*, vol. 20, No. 4, Sep. 1977 pp. 1347–1348, New York, US; J. W. Plant: "Variable Decrementer".

Primary Examiner—Parshotam S. Lall
Assistant Examiner—Krisna Lim
Attorney, Agent, or Firm—Townsend and Townsend Khourie and Crew

[57] ABSTRACT

A system for controlling the number of data pieces in a queue memory includes a counter comprising a plurality of counting circuits each of which adds the current effective data piece number of the instruction queue to an associated, preselected value derived from the difference between a detectable input data piece number and a particular output data piece number. A selector responsive to a selecting signal provided by a queue controller selects one of the counting circuits with the associated preselected value equal to the difference between the current input data piece number and the current output data piece number to provide the effective data piece number. The queue controller calculates this difference and provides it as the selecting signal to the selector.

9 Claims, 2 Drawing Sheets

SYSTEM FOR CONTROLLING THE NUMBER OF DATA PIECES IN A QUEUE MEMORY

This application is a continuation of application Ser. No. 07/388,794, filed on Aug. 2, 1989, now abandoned.

BACKGROUND OF THE INVENTION

1. Field of the Invention

This invention relates to a instruction queue control system of a data processor having a instruction queue, particularly to improvements in a system for controlling the number of pieces of instruction data present in an instruction queue of a data processor having an variable length instruction system.

2. Description of the Prior Art

A prior art instruction queue control system will now be described with reference to FIGS. 3 and 4. Referring to the Figures, reference numeral 1 designates an First In First Out (FIFO) register as memory means for fetching and temporarily storing fetched instructions and providing successive instructions in the order of their input. This FIFO register can realize a instruction queue. Reference numeral 11 designates an adder/subtracter for calculating the number of effective data pieces present in a instruction queue, and 3 a queue controller for controlling the operation of the instruction queue. The FIFO register noted above includes an input line 4, through which are input instructions from a instruction fetch section 40 for fetching instructions from an bus interface section (hereinafter referred to as bus I/F section 30), and an output line 5, through which are output instructions to an instruction decode section 50. The queue controller 3 constitutes part of a central processing unit (CPU) (not shown), and it is accommodated together with the other control sections in the CPU. The instruction fetch section 40 provides an input signal 6 representing the number of data pieces of a fetched instruction to the queue controller 3 and adder/subtracter 11, and the instruction decode section 50 provides an output signal 7 representing the number of data pieces of the instruction which are output from the FIFO register 1 to instruction decoder 50 to the queue controller 3 and adder/subtracter 11. The queue controller 3 outputs instruction data input-output control signal 8. Reference numeral 10 designates an output signal representing the number of effective instruction data pieces, and 12 an adder/subtracter control signal.

FIG. 4 shows the adder/subtracter 11. As is shown, it includes an adder 111 for adding the input signal 6 and prevailing number 114 of data pieces, a subtracter 112 for subtracting the number 115 of data pieces of the sum output of the adder 111 and an output signal 7 from each other and a latch 21 as holding means for holding the number 116 of data pieces of the difference output of the subtracter 112 as prevailing value and providing an instruction data piece number output to the adder 111 and queue controller 3. The adder 111 and subtracter 112 are controlled by the adder/subtracter control signal 12 from the queue controller 3.

In operation, an instruction to be executed is fetched by the instruction fetch section 40 from an external circuit (not shown) through the bus I/F section 30. The fetched instruction is controlled by the queue controller 3 and temporarily stored in the FIFO register 1 to be output to the instruction decode section 50. The fetched instruction is supplied to the instruction decoder section 50 for decoding and execution.

The number of effective data pieces is controlled as follows. It is assumed that the number of instruction data pieces which are fetched at a time is two words and the number of instruction data pieces provided to the instruction decode section 50 is 0, 1 or 2 words. By the term "word" is meant a suitable length for expressing an operation code and operand of instruction data. A case of updating the effective data piece number in a queue is now explained. It is assumed, that the number 114 of effective instruction data pieces in a prevailing queue, i.e., number of data pieces held in the latch 21, is "4", two words of instruction data are input, (number of input data pieces from the input signal 6 being "2"), and one word of instruction data in the queue is provided at a time to the instruction decoder 50 (the number of output data pieces from the output signal 7 being "1"). In this case, the adder 111 adds "4" as the prevailing data piece number 114 and "2" as the number of input data pieces from the input signal 6 under control of an adder/subtracter control addition signal 12a from the queue controller 3, that is, the sum output 115 becomes "4+2=6". Then, the output data piece number of "1" from the output signal 7 is subtracted from the sum output 115 to produce a difference output of "6−1=5". The value of "5" as the difference output 116 is latched as a new value of the number of instruction data pieces in the queue in the latch 21. The value "5" as the instruction data piece number is provided as effective instruction data piece number output signal 10 to the queue controller 3.

Since the prior art instruction queue control system has the construction as described above, for controlling the number of effective data pieces in the queue addition and subtraction have to be performed one after another, thus requiring long calculation time. In addition, the use of the adder/subtracter requires a great amount of hardwares.

SUMMARY OF THE INVENTION

This invention has been intended in order to overcome the drawbacks described above, and its object is to provide an instruction control system, which permits control of the number of effective data pieces in a queue, i.e., calculation of the data piece number, to be effected quickly and permits reduction of hardware.

To attain the above object of the invention, there is provided an instruction queue control system, in which there are provided, in lieu of the adder/subtracter, a counter for controlling instruction data piece number stored in memory means and control means for effecting control of the input and output of instructions to and from the memory means and control of the counter according to an increment/decrement value determined by the numbers of pieces of the input and output data, the counter including a plurality of counting circuits for providing possible instruction piece data number candidates by counting increments and decrements generated from a predetermined combination of an input data piece number and an output data piece number to a prevailing instruction data piece number, selection means for selecting one of the counting circuits according to a control signal selected from the control means according to an actual increment/decrement value and holding means for holding the value selected by the selection means as a new instruction data piece number.

The above and other objects, features and advantages of the invention will become more apparent from the following description when taken in conjunction with the accompanying drawings.

DESCRIPTION OF THE PREFERRED EMBODIMENT

Figure 1:
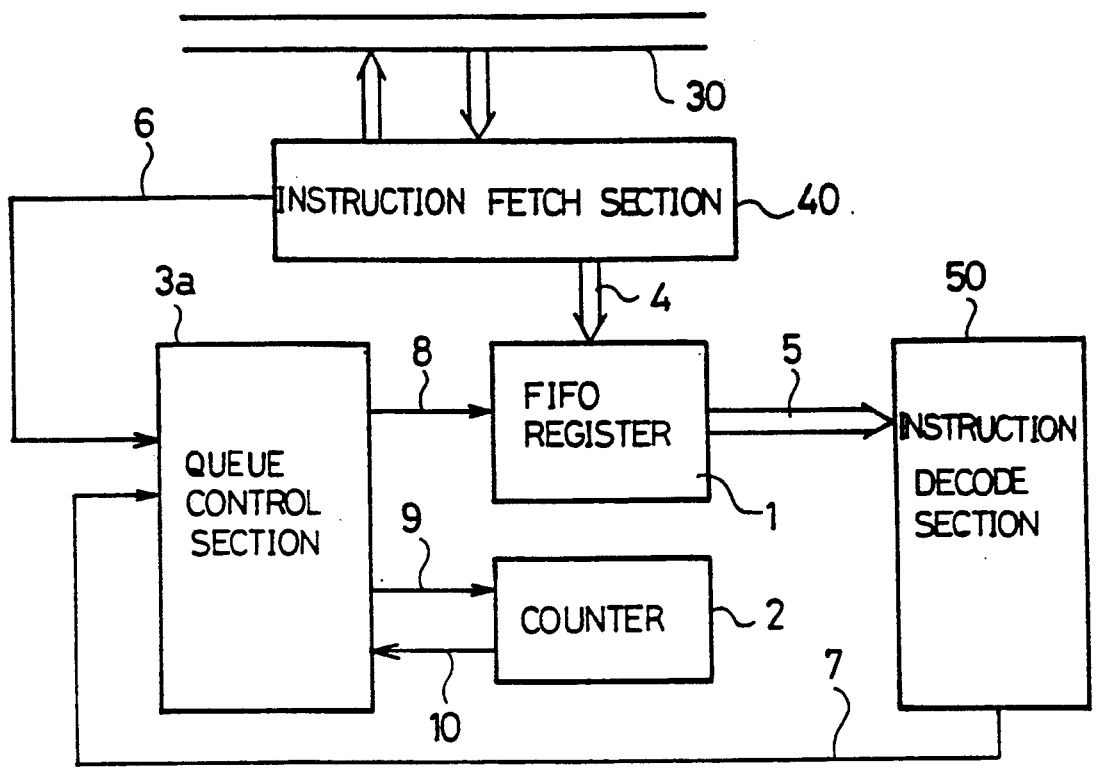
FIG. 1 is a block diagram showing an embodiment of the instruction queue control system according to the invention.
Figure 2:
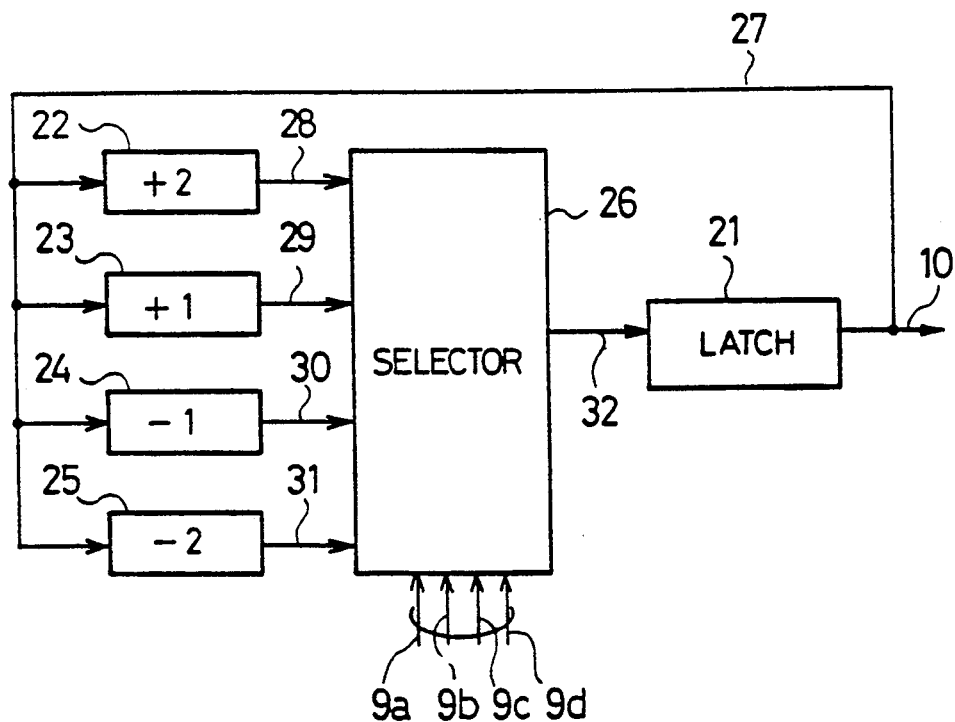
FIG. 2 is a block diagram showing a counter in the same embodiment.
Figure 3:
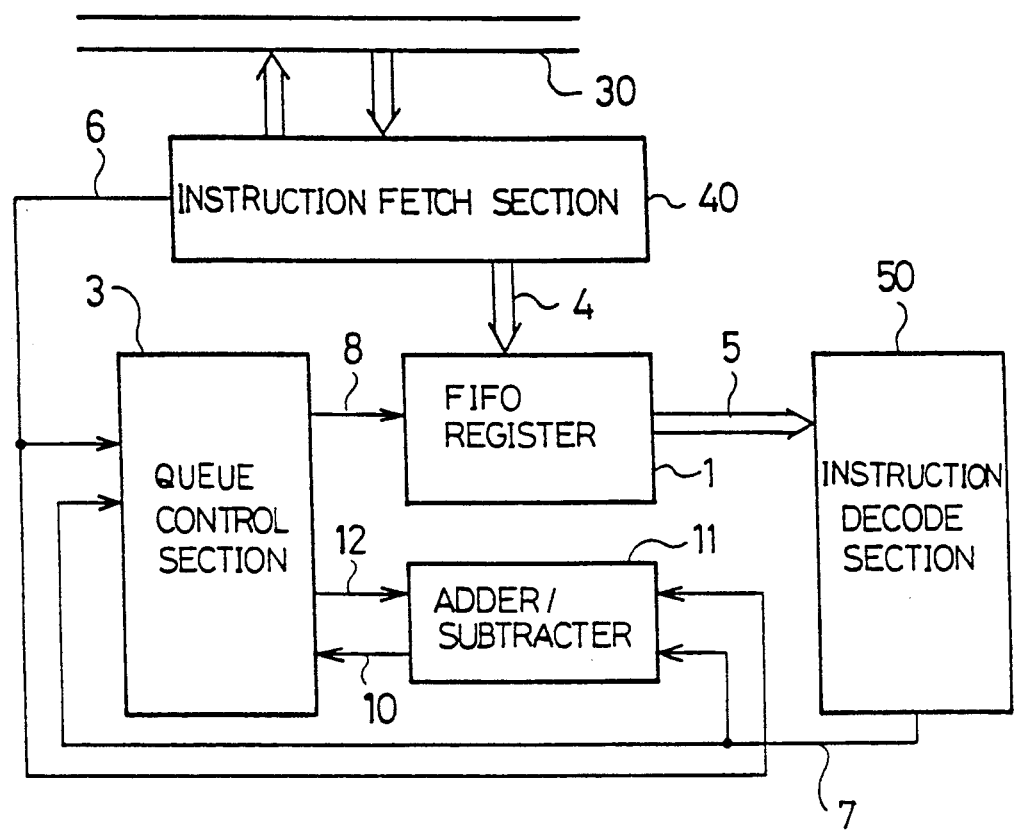
FIG. 3 is a block diagram showing a prior art instruction queue control system.
Figure 4:
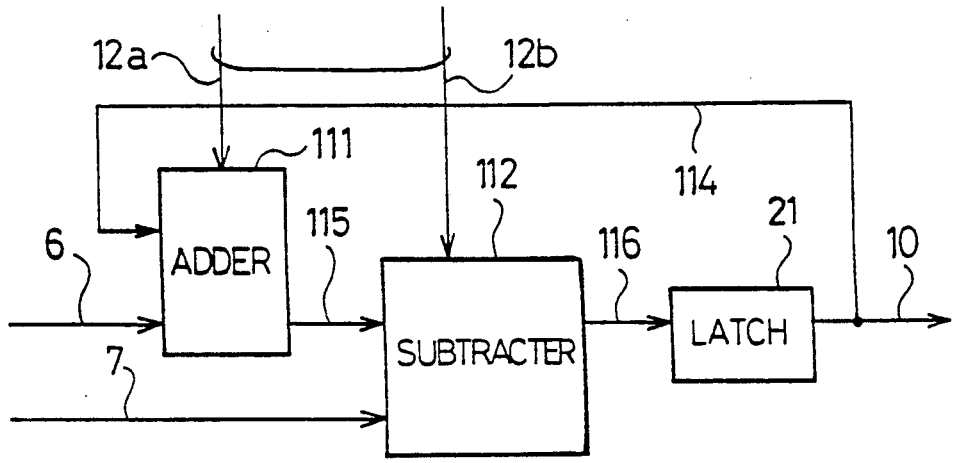
FIG. 4 is a block diagram showing an adder/subtracter in the prior art system of FIG. 3.

Now, an embodiment of the instruction queue control system according to the invention will be described with reference to FIGS. 1 and 2. Parts like those in FIGS. 3 and 4 are designated by like reference numerals with omission of their description. In FIG. 1, reference numeral 2 designates a counter for recording the number of effective data pieces present in FIFO register 1, and 3a a queue controller for controlling the input and output of instructions to and from the FIFO register 1 and also controlling the counter 2 according to an increment/decrement determined by input and output data piece numbers.

The counter 2 is controlled by a counter control signal 9 from the queue controller 3a. As shown in FIG. 2, it includes first to fourth counting circuits 22 to 25, a selector 26 as selection means for selecting either one of the first to fourth counting circuits 22 to 25 according to counter control signals 9a to 9d and a latch 21 like prior art holding means for providing the value from the selector 26 as prevailing value to the first to fourth counting circuits 22 to 25 while holding it and providing it as queue effective instruction data piece number signal 10 to the queue controller 3a. The first to fourth counting circuits 22 to 25 are different from one another as to whether they increment or decrement and also in the value of increment or decrement, and they provide possible instruction data piece number candidates by adding the prevailing value output from latch 21 to the increment or decrement derived from a difference between a detectable input data piece number output from instruction fetch section 40 to queue control section 3a and a particular output data piece output from instruction decode section 50.

For example, assuming that the number of instruction data pieces that are fetched at a time in the instruction fetch section 40 is 2 words and the number of instruction data pieces provided to the instruction decoder section 50 is 0, 1 or 2 words, the first counting circuit 22 adds number "2" to the prevailing data piece number at all time to provide a result output 28 in case when the input word number is "2" and the output word number is "0", the second counting circuit 23 adds number "1" to the prevailing data piece number at all time to obtain a result output 29 in case when the input word number is "2" and the output word number is "1", the third counting circuit 24 adds number "−1" to the prevailing data piece number at all time to obtain a result output 30 in case when the input word number is "0" and the output word number is "1", and the fourth counting circuit 25 adds number "−2" to the prevailing data piece number at all time to obtain a result output 31 in case when the input word number is "0" and the output word number is "2". These counting circuits 22 to 25 are usually called +2 circuit, +1 circuit, −1 circuit and −2 circuit, respectively.

The operation will now be described. An instruction to be executed is fetched in the instruction fetch section 40 from an external circuit (not shown) through the bus I/F section 30. The fetched instruction is controlled by the queue controller 3a and temporarily held in the FIFO register 1 before being provided to the instruction decoder section 50. The instruction decoder section 50 decodes the fetched instruction for execution.

It is now assumed that two words of instruction are input to the queue while at the same time one word of instruction in the queue is output when the prevailing effective instruction data piece number, i.e., a prevailing value 27 held in the latch 21, is "4". At this time, with the prevailing value 27 as input the first to fourth counting circuits 22 to 25 generate respective candidates of the next data piece number for the updating thereof. More specifically, the first counting circuit 22 adds "2" to the prevailing value of "4" to produce "6" as the result output 28, the second counting circuit 23 adds "1" to the prevailing value of "4" to produce "5" as the result output 29, the third counting circuit 24 adds "−1" to the prevailing value of "4" to produce "3" as the result output 30, and the fourth counting circuit 25 adds "−2" to the prevailing value of "4" to produce "2" as the result output 31. At the same time, the queue controller 3a produces increments and decrements of the instruction data piece number, and also the queue control section 3a provides the signal 9b for causing the selector 26 to select the second counting circuit 23. The selector 26 thus selects value "5" generated as the value of updated data piece number in the second counting circuit 23. This value is provided as an updated value 32 to be latched as new data piece number in the latch 21. When the input word number is "2" and output word number "2", the value in the latch 21 need not be changed, so that the queue controller 3a provides none of the counter control signals 9a to 9d, and the prevailing value is held without updating.

In this embodiment four counting circuits are provided, but this is by no means limitative; for example, where a fetched instruction consists of four words, a total of eight different values can be generated, and hence corresponding eight counting circuits are provided.

As has been described in the foregoing, according to the invention there is provided a instruction queue control system, which comprises memory means for providing successive instructions in the order of the input, a counter for controlling the number of instruction data pieces stored in the memory means and control means for effecting control of the input and output of instructions to and from the memory means and control of the counter according to an increment/decrement value determined by the numbers of pieces of the input and output data, the counter including a plurality of counting circuits for providing possible instruction data piece number candidates by counting increments and decrements generated from a predetermined combination of an input data piece number and an output data piece number to a prevailing instruction data piece number, selection means for selecting one of the counting circuits according to a control signal selected from the control means according to an actual increment/decrement value and holding means for holding the value selected by the selection means as a new instruction data piece number. Thus, the calculation of the increment/decrement of the effective instruction data piece number in the queue and calculation of the updated value can be performed concurrently, thus permitting quick control of the effective data piece number of instruction queue in a data processor with a variable length instruction system and improving the processing efficiency of the data processor. In addition, since the counter can be realized with counting circuits and a selector which are simple in construction compared to the adder-subtracter, it is possible to reduce necessary hardware.

What is claimed is:

1. A system for controlling the number of data pieces in a queue memory, comprising:
    means for fetching an external instruction having a detectable number of data pieces and for providing an input information signal representing said detectable number;
    a memory for receiving and storing said external instruction and for providing an instruction having a particular number of data pieces;
    decoding means, receiving said instruction having said particular number of data pieces, for providing an output information signal representing said particular number;
    a counter for holding and updating a combined information signal representing a total number of data pieces presently stored in said memory, said counter further comprising:
        a plurality of means arranged in parallel, each responsive to said current value of said combined information signal for producing an adjusted information signal;
        selecting means, receiving said adjusted information signals and responsive to said second control signal, for providing a selected one of said adjusted information signals; and
        means for receiving and holding said selected adjusted information signal and for providing said selected adjusted information signal as said updated current value of said combined information signal; and
    control means, receiving said current value of said combined information signal and responsive to said input information signal and said output information signal, for providing a first control signal and a second control signal to said memory and said counter, respectively.

2. A system for controlling the number of the data pieces in a queue memory as recited in claim 1 wherein each of said adjusted information signals represents a sum of said current value of said combined information signal and an associated preselected value.

3. A system for controlling the number of data pieces in a queue memory as recited in claim 2 wherein said second control signal represents a difference between said input information signal and said output information signal.

4. A system for controlling the number of data pieces in a queue memory as recited in claim 3 wherein said selected adjusted information signal represents a sum of said current value of said combined information signal and an associated preselected value equal to said difference.

5. A system for controlling the number of data pieces in a queue memory as recited in claim 3 wherein each said sum and said difference are calculated concurrently.

6. A system for controlling the number of data pieces in a queue memory as recited in claim 2 wherein said memory comprises a FIFO register.

7. A system for controlling the number of data pieces in a queue memory as recited in claim 1 wherein said selecting means provides said selected adjusted information signal in response to a selecting signal from one of a plurality of selecting signal lines enabled by said second control signal.

8. A system for controlling the number of data pieces in a queue memory, comprising:
    an instruction fetch section for fetching an external instruction and for detecting and outputting the number of data pieces in the instruction;
    memory means for storing a plurality of instructions successively output from said instruction fetch section, and for outputting said successive instruction on a first-in-first-out basis;
    an instruction decode section for detecting and outputting the number of data pieces in an instruction received from said memory means;
    a queue control section for controlling said memory means and for outputting control signals according to a difference between the number of data pieces output from said instruction fetch section and the number of data pieces output from said instruction decode section;
    n, n being a predetermined integer, incrementor circuits for adding 1, 2, 3, ... and n to a current value, respectively, with said current value representing the effective number of data pieces currently stored in said memory means;
    n decrementer circuits for subtracting 1,2,3, ... and n from said current value, respectively;
    a selector for selecting one circuit among said incrementor circuits and said decrementer circuits according to said control signals for outputting a result derived from the calculation by said selected one circuit on said current value; and
    a latch for outputting said result to said queue control section and to said incrementor circuits and said decrementer circuits as a new current value.

9. A system for controlling the number of data pieces in a queue memory as recited in claim 8 wherein said memory means comprises a FIFO register.

* * * * *